(12) United States Patent
Sohn et al.

(10) Patent No.: US 7,488,552 B2
(45) Date of Patent: Feb. 10, 2009

(54) DIRECT LIQUID FEED FUEL CELL STACK

(75) Inventors: Dong-kee Sohn, Seoul (KR);
Sang-kyun Kang, Seoul (KR);
Seung-jae Lee, Seongnam-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/418,188

(22) Filed: May 5, 2006

(65) Prior Publication Data

US 2006/0292431 A1 Dec. 28, 2006

(30) Foreign Application Priority Data

Jun. 24, 2005 (KR) ........................ 10-2005-0055114

(51) Int. Cl.
*H01M 2/14* (2006.01)
*H01M 8/10* (2006.01)
*H01M 8/04* (2006.01)

(52) U.S. Cl. .............................. 429/38; 429/30; 429/34

(58) Field of Classification Search .............. 429/12–46
See application file for complete search history.

(56) References Cited

U.S. PATENT DOCUMENTS 4,175,165 A * 11/1979 Adlhart ........................ 429/30
5,364,711 A * 11/1994 Yamada et al. ................ 429/15
2001/0041277 A1 * 11/2001 Chang .......................... 429/30
2002/0178920 A1 * 12/2002 Margiott et al. ................ 95/273
2003/0157381 A1 * 8/2003 Van Andel et al. ............ 429/19
2003/0215686 A1 * 11/2003 DeFilippis et al. ............ 429/34
2005/0064261 A1 * 3/2005 Breault et al. ................. 429/32
2005/0074652 A1 * 4/2005 Choi ........................... 429/32

FOREIGN PATENT DOCUMENTS

JP 06-188008 7/1994

OTHER PUBLICATIONS

Office Action issued on Sep. 20, 2006 by the Korean Intellectual Property Office for Korean Patent Application No. 2005-55114.
Office Action issued on Nov. 16, 2007 by the Chinese Intellectual Property Office for Chinese Patent Application No. 200610077191.7.

* cited by examiner

*Primary Examiner*—Susy N Tsang-Foster
*Assistant Examiner*—Maria J Laios
(74) *Attorney, Agent, or Firm*—Stein, McEwen & Bui, LLP

(57) ABSTRACT

A direct liquid feed fuel cell stack has a structure in which membrane electrode arrays (MEAs), each having an anode electrode and a cathode electrode on either side of an electrode membrane, are stacked and a conductive anode plate and a conductive cathode plate are respectively formed to face the anode electrode and the cathode electrode, wherein the cathode plate comprises a plurality of straight flow channels in parallel, and a hydrophilic member, whose upper surface has the same plane as a bottom surface of the straight flow channel, is disposed perpendicular to the flow channels on one end of the cathode plate.

13 Claims, 5 Drawing Sheets

DIRECT LIQUID FEED FUEL CELL STACK

CROSS-REFERENCE TO RELATED PATENT APPLICATION

This application claims the benefit of Korean Patent Application No. 2005-55114, filed on Jun. 24, 2005, in the Korean Intellectual Property Office, the disclosure of which is incorporated herein in its entirety by reference.

BACKGROUND OF THE INVENTION

1. Field of the Invention

Aspects of the present invention relate to a direct liquid feed fuel cell stack, and more particularly, to a direct liquid feed fuel cell stack having a structure that prevents an oxygen flow channel from blockage by water generated at a cathode electrode.

2. Description of the Related Art

A direct liquid feed fuel cell generates electricity by electrochemical reactions between an organic fuel, such as methanol or ethanol, and an oxidant, i.e., oxygen in the air. The direct liquid feed fuel cell has a high specific energy density and a high current density. Also, since a liquid fuel such as methanol is fed directly to the cell, the direct feed fuel cell does not require a peripheral device such as a fuel reformer, and storing and supplying the liquid fuel is easy.

As depicted in FIG. 1, a unit cell of the direct feed fuel cell has a membrane electrode assembly (MEA) structure having an electrolyte membrane 1 interposed between an anode electrode 2 and a cathode electrode 3. The anode electrode 2 includes a diffusion layer 22 for supplying and diffusing fuel, a catalyst layer 21 at which oxidation of the fuel occurs, and an electrode supporting layer 23. The cathode electrode 3 also includes a diffusion layer 32 for supplying and diffusing the fuel, a catalyst layer 31 at which reduction of the fuel occurs, and an electrode supporting layer 33.

An electrode reaction of a direct methanol fuel cell (DMFC), which is a type of direct liquid feed fuel cell, includes an anode reaction where fuel is oxidized and a cathode reaction where hydrogen and oxygen are reduced as described below.

$CH_3OH+H_2O \rightarrow CO_2+6H^++6e^-$ (Anode reaction)     [Reaction 1]

$3/2O_2+6H^++6e^- \rightarrow 3H_2O$ (Cathode reaction)     [Reaction 2]

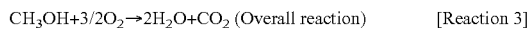

$CH_3OH+3/2O_2 \rightarrow 2H_2O+CO_2$ (Overall reaction)     [Reaction 3]

Carbon dioxide, hydrogen ions, and electrons are produced at the anode electrode 2 where the fuel is oxidized (reaction 1). The hydrogen ions migrate to the cathode electrode 3 through a hydrogen ion exchange membrane 1. At the cathode electrode 3, water is produced by the reduction reaction (reaction 2) between hydrogen ions, electrons transferred through an external circuit, and oxygen. Accordingly, water and carbon dioxide are produced as the result of the overall electrochemical reaction (reaction 3) between methanol and oxygen.

The theoretical voltage that can be generated by a unit cell of a DMFC is approximately 1.2 V. However, the open circuit voltage at ambient temperature and atmospheric pressure can fall below 1 V due to a voltage drop caused by an activation overvoltage and an ohmic overvoltage. In reality, the actual operating voltage lies in the range of 0.4~0.6 V. Therefore, to obtain higher voltages, a plurality of unit cells are connected in series.

A direct liquid feed fuel cell stack is formed by electrically connecting several unit cells in series and assembling them into a stack. Adjacent unit cells are connected by a conductive bipolar plate 4 between the unit fuel cells. Flow channels 41 and 42 are formed on both sides of the bipolar plate 4, to supply liquid fuel or air to the contacting electrodes.

An oxygen supply route, such as an air flow channel, is formed on a surface of the bipolar plate 4 facing the cathode electrode 3. However, water produced at the cathode electrode 3 can block the air flow channel. This can reduce the generation of electricity and increase the pressure of a fan or blower in the flow channel.

SUMMARY OF THE INVENTION

Aspects of the present invention provide a direct liquid feed fuel cell stack having a structure that easily removes water from an air flow channel, which is an oxygen supply route, and a direct liquid feed fuel cell having the direct liquid feed fuel cell stack.

Aspects of the present invention also provide a direct liquid feed fuel cell stack having a structure in which a plurality of stacked membrane electrode arrays (MEAs), each having an anode electrode and a cathode electrode on either side of an electrode membrane, a conductive anode plate and a conductive cathode plate respectively facing the anode electrode and the cathode electrode, wherein the cathode plate comprises a plurality of straight flow channels in parallel, and a hydrophilic member, wherein an upper surface of the hydrophilic member is coplanar with a bottom surface of the straight flow channel, and which is disposed perpendicular to the flow channels on one end of the cathode plate.

According to an aspect of the present invention, ends of the hydrophilic members may be connected to each other, and a water pump may be connected to the hydrophilic members.

According to an aspect of the present invention, both ends of the straight flow channel may be open.

According to an aspect of the present invention, the hydrophilic member may be formed of a foam member having pores.

The cathode plate may comprise fuel flow holes that pass through a protruding portion between the straight flow channels.

According to another aspect of the present invention, a direct liquid feed fuel cell stack comprises a plurality of stacked membrane electrode assemblies, each membrane electrode assembly having an anode electrode and a cathode electrode on either side of an electrode membrane, a conductive anode plate and a conductive cathode plate respectively facing the anode electrode and the cathode electrode, wherein the conductive cathode plate comprises a plurality of straight flow channels in parallel, and a hydrophilic member, wherein hydrophilic member is attached to the conductive cathode plate positioned to absorb water that collects in the plurality of straight flow channels and wherein the hydrophilic member is configured and positioned so as to not block an air flow through the straight flow channels.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
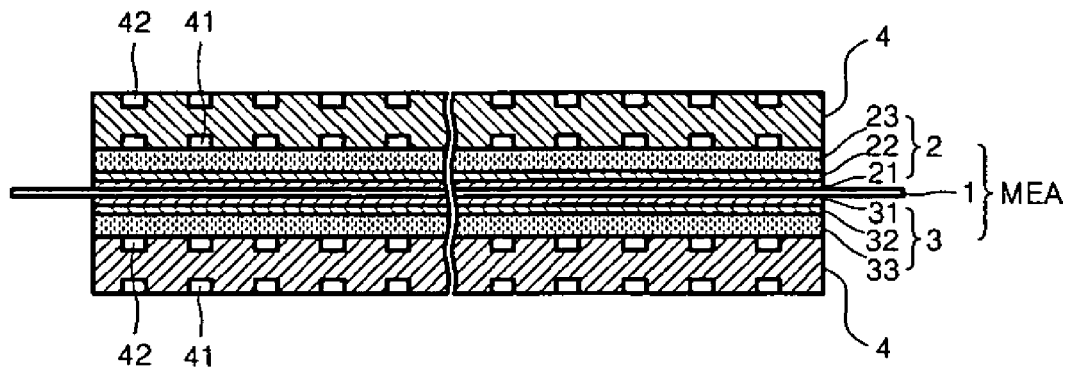
FIG. 1 is a cross-sectional view of a unit cell of a direct liquid feed fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
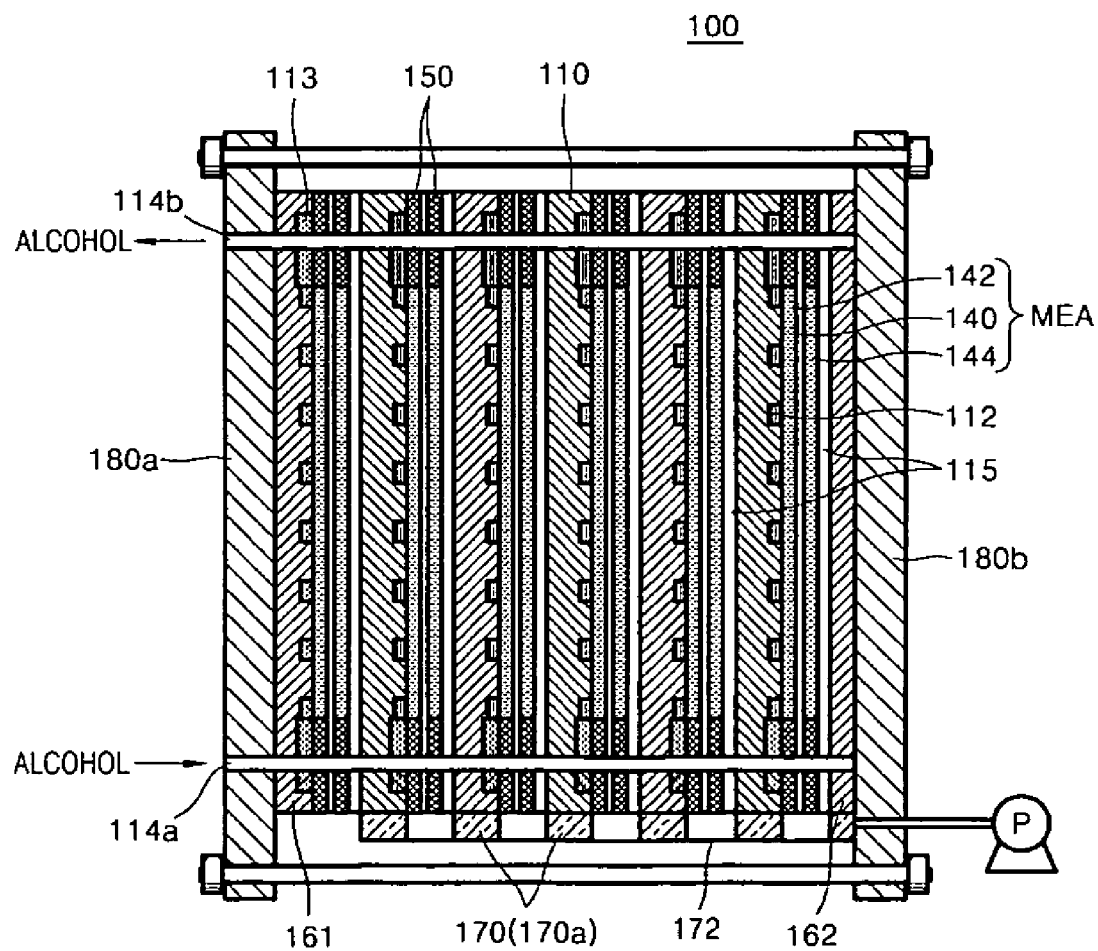
FIG. 2 is a cross-sectional view of a direct liquid feed fuel cell stack according to an embodiment of the present invention.

FIG. 2 is a cross-sectional view of a direct liquid feed fuel cell stack 100 according to an embodiment of the present invention. The direct liquid feed fuel cell stack 100 includes a plurality of vertically stacked membrane electrode assemblies (MEAs) and conductive bipolar plates 110, comprising an anode plate portion and a cathode plate portion interposed between the MEAs. Each MEA includes an anode electrode 142 and a cathode electrode 144 on either side of a membrane 140. A conductive anode plate 161 and a conductive cathode plate 162 respectively contacting the anode electrode 142 and the cathode electrode 144 are located on both outer sides of the direct liquid feed fuel cell stack 100. The surface of the conductive anode endplate 161 has the same structure as the surface of the anode plate portion of the bipolar plates 110 and the surface of the conductive cathode endplate 162 has the same structure as the surface of the cathode plate portion of the bipolar plates 110. Herein, both the anode plate portion of the conductive bipolar plate and the conductive anode plate 161 may be referred to as a conductive anode plate, and both the cathode plate portion of the conductive bipolar plate and the conductive cathode plate 162 may be referred to as a conductive cathode plate. In other words, when the term "conductive cathode plate" is used herein, it refers to both the cathode plate portion of a conductive bipolar plate and to the conductive cathode endplate 162. Likewise, when the term "conductive anode plate" is used herein, it refers to both the anode plate portion of a conductive bipolar plate and to the conductive anode endplate 161. The action of the conductive anode endplate 161 and the conductive cathode endplate 162 is the same as that of the anode plate portion and cathode plate portion of the conductive bipolar plates 110, respectively. The MEAs and the bipolar plates 110, the anode plate 161, and the cathode plate 162 are fixed by fixing end plates 180a and 180b by coupling with screws.

Reference numeral 150 indicates a sealing member, such as a gasket, which prevents the liquid fuel from leaking from fuel flow holes 114a and 114b to the cathode electrode 144.

Figure 3:
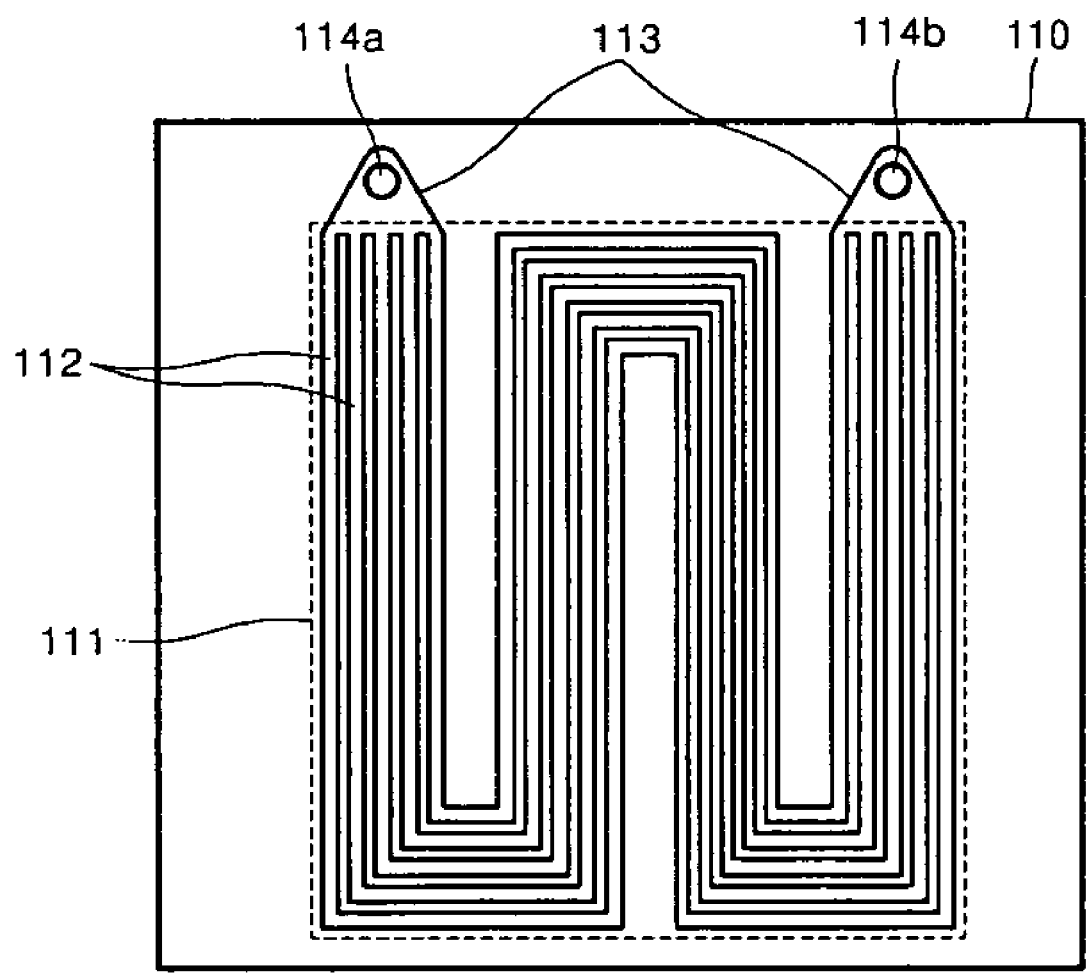
FIG. 3 is a plan view of a surface of the bipolar plate of FIG. 2 having a liquid fuel flow channel.

FIG. 3 is a plan view of a surface of the anode plate portion of the conductive bipolar plate 110 of FIG. 2 having a liquid fuel flow channel. The surface of the conductive anode plate 161 has the same shape as depicted in FIG. 3. In the conductive bipolar plate 110, a plurality of fuel channels 112, which, for example, may have a serpentine shape or any other shape that provides an increased length in a defined area, are formed on an electrode region 111 where the MEA is located, and upper parts of the fuel channels 112 are opened. Manifolds 113 are connected to the fuel channels 112, and the fuel flow holes 114a and 114b pass through the bipolar plate 110 and are connected to the manifolds 113 to supply and discharge the liquid fuel to and from the fuel cell at a region outside the electrode region 111. The manifolds 113 connect the fuel flow holes 114a and 114b to the plurality of fuel channels 112.

Figure 4:
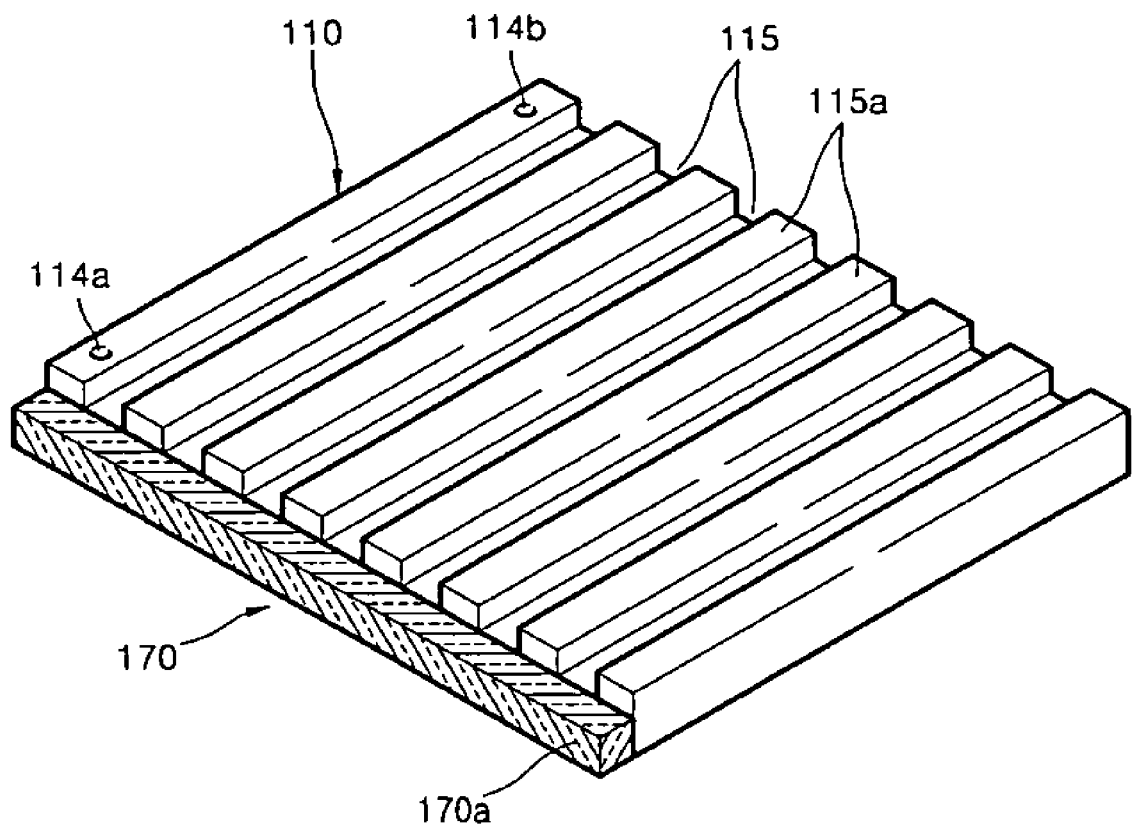
FIG. 4 is a perspective view of a surface of the bipolar plate of FIG. 2 having air flow channels.

FIG. 4 is a perspective view of a surface of the cathode plate portion of the conductive bipolar plate 110 of FIG. 2 having an air flow channel. The air flow channel has a plurality of straight flow channels 115 shaped as grooves, which can have a rectangular cross-section, although other groove shapes may be used. The straight flow channel 115, in addition to serving as an air flow channel, also conveys water generated by the cathode reaction. The water is conveyed in one direction down the air flow channel by gravity and/or by the flow of air entering the air flow channel. The conveyed water eventually forms water drops on the bottom of the straight flow channel 115.

A hydrophilic member 170 that absorbs the water drops is located on one side of the conductive bipolar plate 110. The hydrophilic member 170 has a surface that is coplanar with the bottom surface of the straight flow channel 115. Therefore, a water drop that travels along the bottom of the straight air flow channel flows directly onto the surface of the hydrophilic member 170. The upper surface of the hydrophilic member 170 contacts and absorbs the water drops. Typically, the surface of the hydrophilic member is an upper surface of the hydrophilic member, so that the absorption of the water drop by the hydrophilic member is assisted by gravity. One end 170a of the hydrophilic member 170 is connected to the another hydrophilic member 172 of the fuel cell stack and a water pump P can be connected to discharge the water absorbed by the hydrophilic member 172 to the outside.

The fuel flow holes 114a and 114b may be formed through a protruded portion 115a of the cathode plate portion of the bipolar plate 110, that is, through a portion of the cathode plate portion that is between adjacent flow channels 115.

The hydrophilic members 170 and 172 can be formed of a porous material, such as sponge or polyethylene or polypropylene processed to have pores.

The hydrophilic member 170 according to an aspect of the present invention does not cause pressure loss for entering air since it is formed so as not to block the air flow channel.

Figure 5:
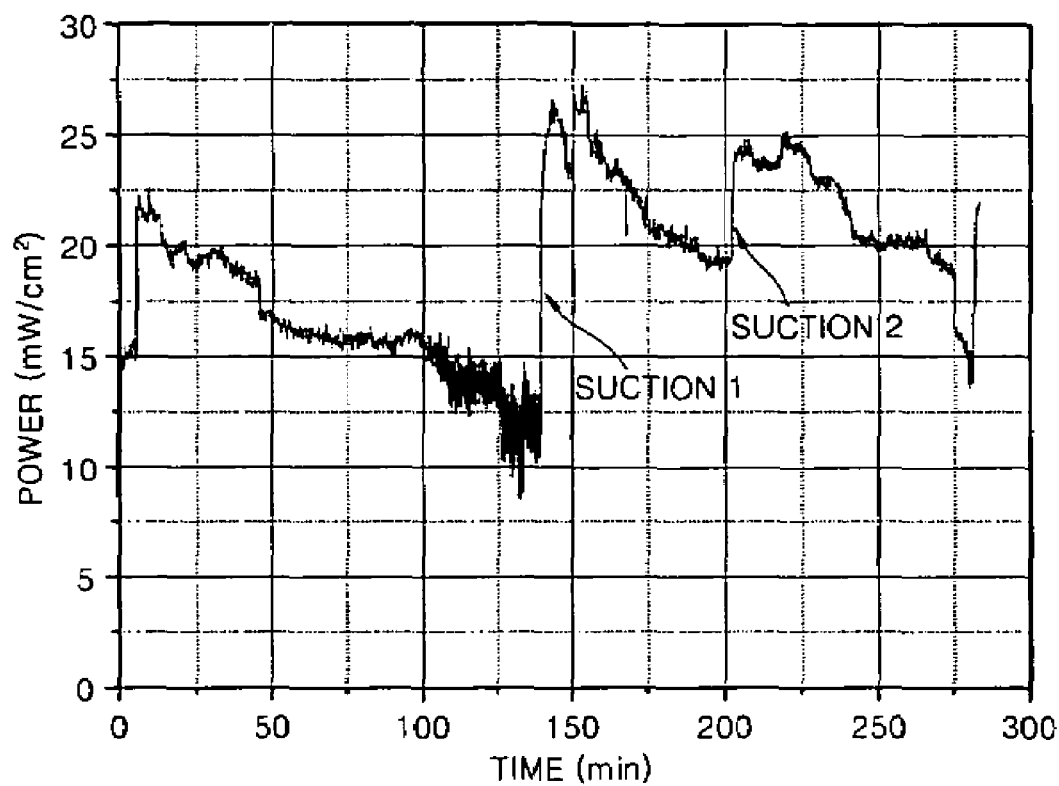
FIG. 5 is a graph showing the power of a conventional direct liquid feed fuel cell stack.

FIG. 5 is a graph showing the power produced by a conventional direct liquid feed fuel cell stack.

Referring to FIG. 5, the power produced by the conventional direct liquid feed fuel cell stack drops over time. The cause is assumed to be that the air flow channel in the cathode plate is blocked by water. Suction 1 and suction 2 indicate that the power of the direct liquid feed fuel cell stack is instantly recovered by removing water.

Figure 6:
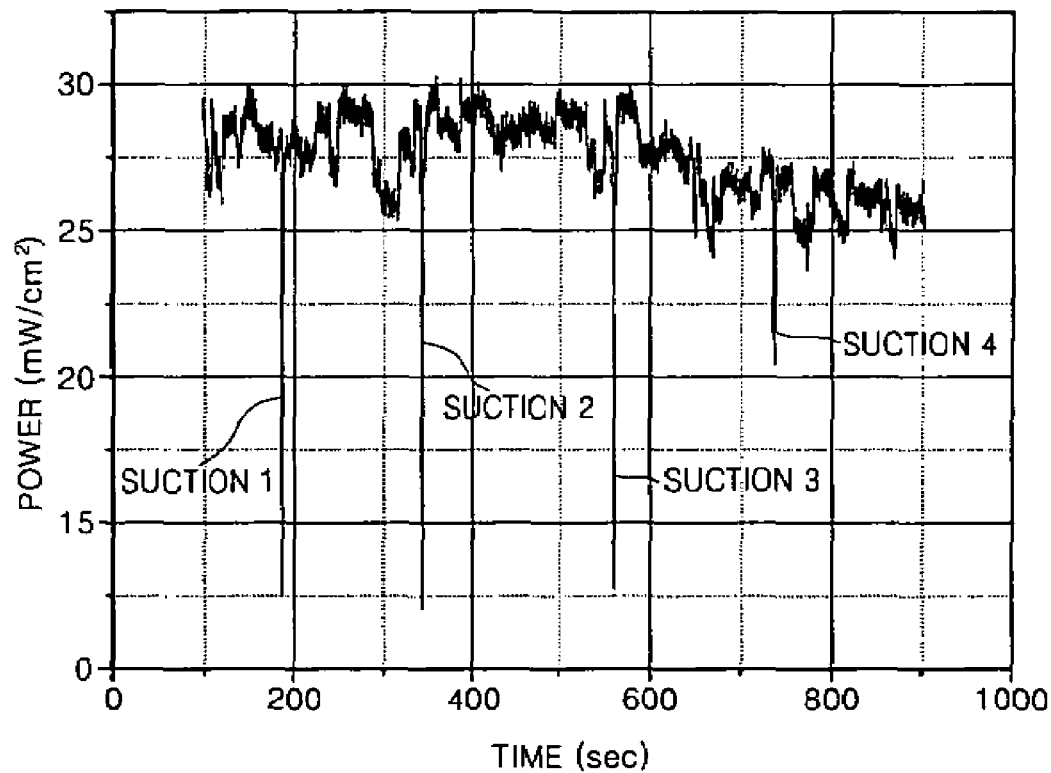
FIG. 6 is a graph showing the power of a direct liquid feed fuel cell stack according to an embodiment of the present invention.

FIG. 6 is a graph showing the power produced by a direct liquid feed fuel cell stack according to an embodiment of the present invention.

Referring to FIG. 6, the power of the direct liquid feed fuel cell stack maintains a constant high level according to the removal of water using a water pump at suctions 1 to 4.

Figure 7:
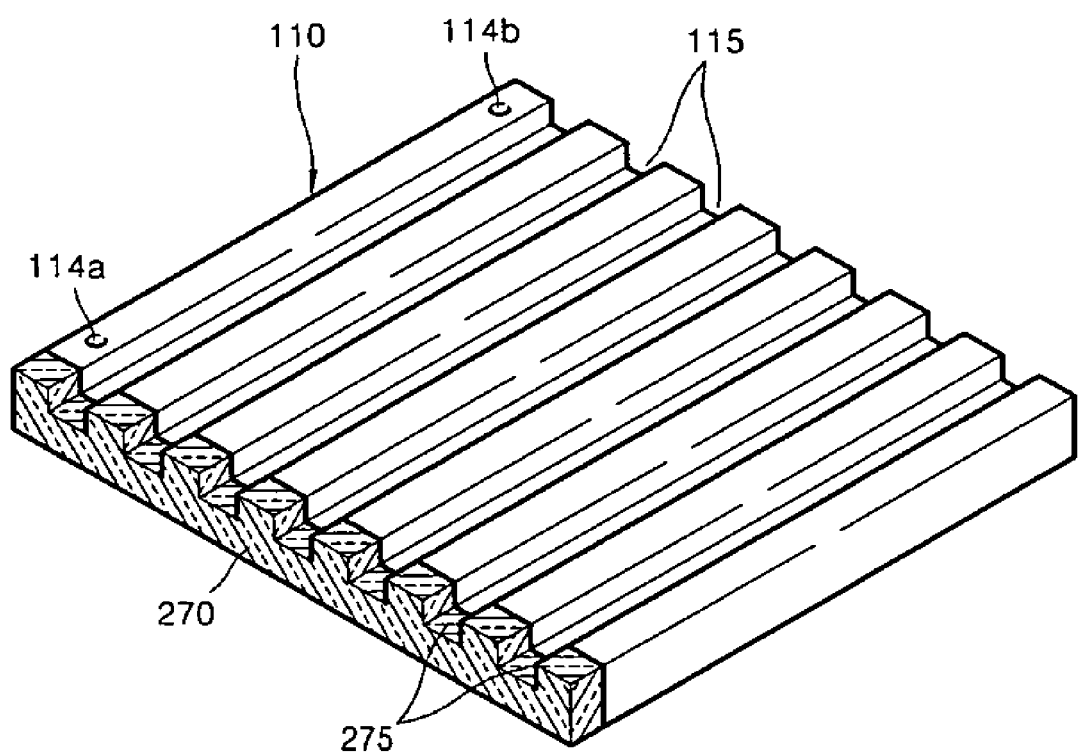
FIG. 7 is a perspective view of a bipolar plate according to another embodiment of the present invention.

FIG. 7 is a perspective view of a bipolar plate according to another embodiment of the present invention. Reference numerals common to FIG. 7 and FIG. 4 denote like elements, and thus the descriptions thereof are omitted.

The air flow channel is formed of a plurality of straight flow channels 115. The straight flow channels 115 convey water generated by a cathode reaction downwards by gravity and by the flow of air entering, and the conveyed water eventually forms water drops on the bottom of the straight flow channel 115.

A hydrophilic member 270 that absorbs the water drops is located on one side of the bipolar plate 110. The hydrophilic member 270 forms an extension of an end of the bipolar plate 110. The hydrophilic member 270 also includes a groove 275 extending from the straight flow channel 115, and water drops that contact the groove 275 at the end of the straight flow channel 115 are absorbed by the hydrophilic member 270 with the aid of gravity and the flow of entering air.

The hydrophilic member 270 can be formed of a porous material such as sponge, or polyethylene or polypropylene processed to have pores.

The hydrophilic member 270 according to aspects of the present invention does not cause the pressure loss of entering air since it is formed so as not to block the air flow channel.

As described above, in the direct liquid feed fuel cell stack according to the present invention, one end of a conductive plate that contacts a cathode electrode is connected to a hydrophilic member that does not block an air path formed in the conductive plate. Therefore, water drops generated on the bottom of the air path can be easily absorbed by the hydrophilic member, and this does not cause the loss of pressure in the air flow channel.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A direct liquid feed fuel cell stack comprising a plurality of stacked membrane electrode assemblies, each membrane electrode assembly having an anode electrode and a cathode electrode on either side of an electrode membrane, a conductive anode plate and a conductive cathode plate respectively facing the anode electrode and the cathode electrode, wherein the conductive cathode plate comprises at least one air flow channel, and a member that absorbs water disposed on one end of the conductive cathode plate at the location of one end of the at least one air flow channel and having grooves corresponding in shape to the at least one air flow channel.

2. The direct liquid feed fuel cell stack of claim 1, wherein ends of the members that absorb water of each membrane electrode assembly are connected to each other.

3. The direct liquid feed fuel cell stack of claim 2, wherein a water pump is connected the members that absorb water.

4. The direct liquid feed fuel cell stack of claim 1, wherein both ends of the at least one air flow channel are open.

5. The direct liquid feed fuel cell stack of claim 1, wherein the member that absorbs water is formed of a foam member having pores.

6. The direct liquid feed fuel cell stack of claim 1, wherein the conductive cathode plate comprises fuel flow holes that pass through a protruding portion of the conductive cathode plate between the at least one air flow channel.

7. A direct liquid feed fuel cell stack comprising a plurality of stacked membrane electrode assemblies, each membrane electrode assembly having an anode electrode and a cathode electrode on either side of an electrode membrane, a conductive anode plate and a conductive cathode plate respectively facing the anode electrode and the cathode electrode, wherein the conductive cathode plate comprises at least one air flow channel, and a member that absorbs water, wherein the member that absorbs water is attached to the conductive cathode plate positioned to absorb water that collects in the at least one air flow channel and wherein the member that absorbs water is configured and positioned so as to not block an air flow through the at least one air flow channel, wherein the at least one air flow channel and the member that absorbs water are positioned with respect to each other such that water collecting on the at least one air flow channel travels to the member that absorbs water by gravity and/or by a force of air through the at least one air flow channel, and wherein the member that absorbs water has grooves corresponding in shape to the at least one air flow channel.

8. The direct liquid feed fuel cell stack of claim 7, wherein ends of the members that absorb water of the membrane electrode assemblies are connected to each other.

9. The direct liquid feed fuel cell stack of claim 8 wherein a water pump is connected to the members that absorb water.

10. The direct liquid feed fuel cell stack of claim 7, wherein both ends of the at least one air flow channel are open.

11. The direct liquid feed fuel cell stack of claim 7, wherein the member that absorbs water is formed of a foam member having pores.

12. The direct liquid feed fuel cell stack of claim 7, wherein the conductive cathode plate comprises fuel flow holes that pass through a protruding portion of the conductive cathode plate between the at least one air flow channel.

13. The direct liquid feed fuel cell stack of claim 7, wherein the member that absorbs water has an upper surface that is coplanar with a bottom surface of the at least one air flow channel.

* * * * *